United States Patent
Griffin et al.

(10) Patent No.: US 12,321,356 B1
(45) Date of Patent: Jun. 3, 2025

(54) GENERATING PERSONA-BASED CONTEXTUAL REPORTS

(71) Applicant: INTERNATIONAL BUSINESS MACHINES CORPORATION, Armonk, NY (US)

(72) Inventors: Adam Lee Griffin, Cohasset, MN (US); Balaji Muthusamy Pandurangan, Amstelveen (NL); Santosh Rajashekar, Bangalore (IN); Richard Daniel Gunjal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/515,420

(22) Filed: Nov. 21, 2023

(51) Int. Cl.
  *G06F 16/23* (2019.01)
  *G06F 16/245* (2019.01)
  *G06F 16/2457* (2019.01)

(52) U.S. Cl.
  CPC ........ *G06F 16/24575* (2019.01); *G06F 16/23* (2019.01)

(58) Field of Classification Search
  None
  See application file for complete search history.

(56) References Cited

U.S. PATENT DOCUMENTS

| | | | |
|---|---|---|---|
| 7,680,823 B2 | 3/2010 | Garfinkle | |
| 8,494,987 B2 | 7/2013 | Katukuri | |
| 8,769,392 B2 | 7/2014 | Lord | |
| 9,047,562 B2 | 6/2015 | Okabe | |
| 9,479,357 B1* | 10/2016 | Fu | G06F 16/23 |
| 9,713,774 B2 | 7/2017 | Hoomani | |
| 10,102,278 B2* | 10/2018 | Polonsky | G06F 16/337 |
| 11,307,880 B2 | 4/2022 | Martin | |
| 12,141,903 B1* | 11/2024 | Reynolds | G06F 16/95 |
| 2003/0154177 A1 | 8/2003 | Holland | |
| 2011/0252014 A1* | 10/2011 | Mital | G06F 16/9535 |
| | | | 707/706 |
| 2020/0167464 A1 | 5/2020 | Griffin | |
| 2022/0188848 A1* | 6/2022 | Noble | G06F 16/24 |
| 2022/0417271 A1 | 12/2022 | Sherwood | |
| 2023/0067944 A1* | 3/2023 | Ares | G06F 16/26 |
| 2024/0249081 A1* | 7/2024 | UzZaman | G06F 16/245 |

OTHER PUBLICATIONS

Chandu, et al., "My Way of Telling a Story: Persona based Grounded Story Generation", Proceedings of the Second Storytelling Workshop, Aug. 1, 2019, pp. 11-21.

(Continued)

*Primary Examiner* — Son T Hoang
(74) *Attorney, Agent, or Firm* — Rakesh Roy

(57) ABSTRACT

An embodiment may receive observed data from a monitored system. The embodiment may receive a request to generate a contextual report based on the observed data. The embodiment may identify a relevant persona corresponding to the request based on a series of linguistic cues. The embodiment may identify a list of suitable keywords based on the identified relevant persona. The embodiment may generate a persona-based contextual report for the observed data based on the identified relevant persona and the list of suitable keywords.

20 Claims, 3 Drawing Sheets

(56) References Cited

OTHER PUBLICATIONS

IBM, "IBM Security QRadar EDR", https://www.ibm.com/products/qradar-edr, Accessed on Nov. 1, 2023, 14 pages.
IBM, "IBM Security QRadar Suite", https://www.ibm.com/qradar, Accessed on Oct. 18, 2023, 9 Pages.
IBM, "IBM Security Randori Recon", https://www.ibm.com/products/randori-recon, Accessed on Oct. 18, 2023, 8 Pages.
Lin, et al., "Other Roles Matter! Enhancing Role-Oriented Dialogue Summarization via Role Interactions", Proceedings of the 60th Annual Meeting of the Association for Computational Linguistics, vol. 1: Long Papers, May 22-27, 2022, pp. 2545-2558.
Ma, et al.. "Dependency Structure for News Document Summarization", arXiv:2109.11199v2 [cs.CL], Feb. 22, 2022, 12 Pages.
Griffin, et al., "Conditional Hypothesis Generation for Enterprise Process Trees", U.S. Appl. No. 18/513,777, filed Nov. 20, 2023, 26 Pages.

\* cited by examiner

GENERATING PERSONA-BASED CONTEXTUAL REPORTS

BACKGROUND

The present application relates generally to computer processing, and more particularly, to generating person-based contextual reports.

Many businesses leverage generated contextual reports to convey insights and information related to a wide variety of events, incidents, or Information Technology functions. For example, in the context of cybersecurity environments, contextual reports may provide comprehensive and detailed written descriptions that provide contextual information and insights about various security events, incidents, or threats within a specific Information Technology environment. Effective use of contextual reports assists various actors of a given business with making informed decisions and taking appropriate actions to mitigate risks and strengthen the posture of relevant systems. Accordingly, businesses constantly stive to generate contextual reports which provide the most utility and value to individual users.

SUMMARY

According to one embodiment, a method, computer system, and computer program product for generating person-based contextual reports is provided. The embodiment may include receiving observed data from a monitored system. The embodiment may also include receiving a request to generate a contextual report based on the observed data. The embodiment may further include identifying a relevant persona corresponding to the request based on a series of linguistic cues. The embodiment may also include identifying a list of suitable keywords based on the identified relevant persona. The embodiment may further include generating a persona-based contextual report for the observed data based on the identified relevant persona and the list of suitable keywords.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
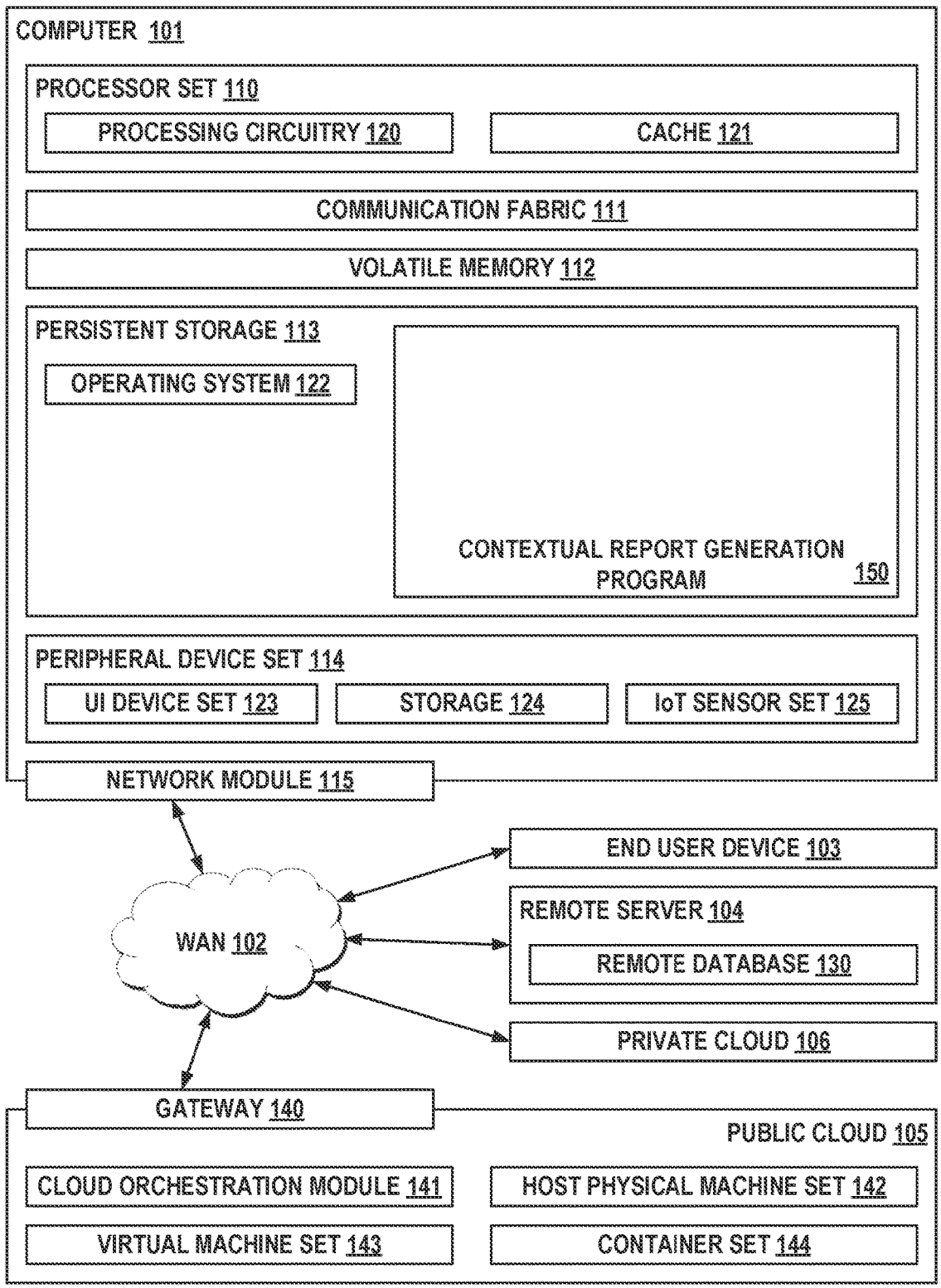
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to generating person-based contextual reports. The following described exemplary embodiments provide a system, method, and program product to, among other things, receive observed data from a monitored system, receive a request to generate a contextual report based on the observed data, identify a relevant persona corresponding to the request based on a series of linguistic cues, identify a list of suitable keywords based on the identified relevant persona, and generate a persona-based contextual report for the observed data based on the identified relevant persona and the list of suitable keywords.

While the illustrative examples discussed herein are related to cybersecurity environments, it is envisioned that described embodiments may be leveraged to generate persona-based contextual reports in any suitable environment using the described methods.

As previously described, many businesses leverage generated contextual reports to convey insights and information related to a wide variety of events, incidents, or Information Technology functions. For example, in the context of cybersecurity environments, contextual reports may provide comprehensive and detailed written descriptions that provide contextual information and insights about various security events, incidents, or threats within a specific Information Technology environment. Effective use of contextual reports assists various actors of a given business with making informed decisions and taking appropriate actions to mitigate risks and strengthen the posture of relevant systems. Accordingly, businesses constantly stive to generate contextual reports which provide the most utility and value to individual users.

However, there are various challenges experienced by businesses generating contextual reports. One specific challenge relates to ensuring that a generated contextual report utilizes language that can effectively and efficiently communicate information contained therein. This challenge is complicated by the variety of roles or user types that may be associated with various individuals meant to utilize generated contextual reports. For example, in a cybersecurity environment, there may be cybersecurity professionals, analysts, executives, and a variety of other stakeholders who may each benefit from utilizing generated contextual reports for detailed event descriptions, root cause analysis, affected assets, risk assessment and recommended mitigation strategies, and more. However, the language and context within each generated report may not be familiar or valuable to a given individual based on their role and knowledge set. This may create a knowledge gap in the understanding of a generated contextual report by a user which may subsequently result in negative outcomes for the business. For example, if an executive cannot understand a generated contextual report with a high volume of technical details, the communicated cybersecurity threat may be neglected or taken less seriously, resulting in negative outcomes later.

Businesses would benefit greatly from generating contextual reports which effectively communicate the information contained therein to any user utilizing the generated contextual report.

Accordingly, a method, computer system, and computer program product for generating person-based contextual reports would be advantageous. The method, system, and computer program product may receive observed data from a monitored system. The method, system, computer program product may receive a request to generate a contextual report based on the observed data. The method, system, computer program product may identify a relevant persona corresponding to the request based on a series of linguistic cues. The method, system, computer program product may identify a list of suitable keywords based on the identified relevant persona. Thereafter, the method, system, computer program product may generate a persona-based contextual report for the observed data based on the identified relevant persona and the list of suitable keywords. In turn, the method, system, computer program product has provided for generation of improved person-based contextual reports. Described embodiments leverage linguistic cues to identify a relevant persona that corresponds to an appropriate context for the contextual report to be generated. Described embodiments further identify and leverage suitable keywords that are appropriate for the identified persona to ensure that the individual utilizing the contextual report will be able to easily comprehend the generated contextual report. This combination of steps allows for text generation using a guided approach for different personas without deviating form the nature of the linguistic characteristics used and relied upon by different types of individuals who may have different roles within an organization.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as contextual report generation program/code 150. In addition to contextual report generation code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and contextual report generation code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in contextual report generation code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in contextual report generation program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the contextual report generation program 150 may be a program capable of receiving observed data from a monitored system. Contextual report generation program 150 may then receive a request to generate a contextual report based on the observed data. Next, contextual report generation program 150 may identify a relevant persona corresponding to the request based on a series of linguistic cues. Contextual report generation program 150 may then identify a list of suitable keywords based on the identified relevant persona. Thereafter, contextual report generation program 150 may generate a persona-based contextual report for the observed data based on the identified relevant persona and the list of suitable keywords. In turn, contextual report generation program 150 has provided for generation of improved person-based contextual reports. Described embodiments leverage linguistic cues to identify a relevant persona that corresponds to an appropriate context for the contextual report to be generated. Described embodiments further identify and leverage suitable keywords that are appropriate for the identified persona to ensure that the individual utilizing the contextual report will be able to easily comprehend the generated contextual report. This combination of steps allows for text generation using a guided approach for different personas without deviating form the nature of the linguistic characteristics used and relied upon by different types of individuals who may have different roles within an organization.

Figure 2:
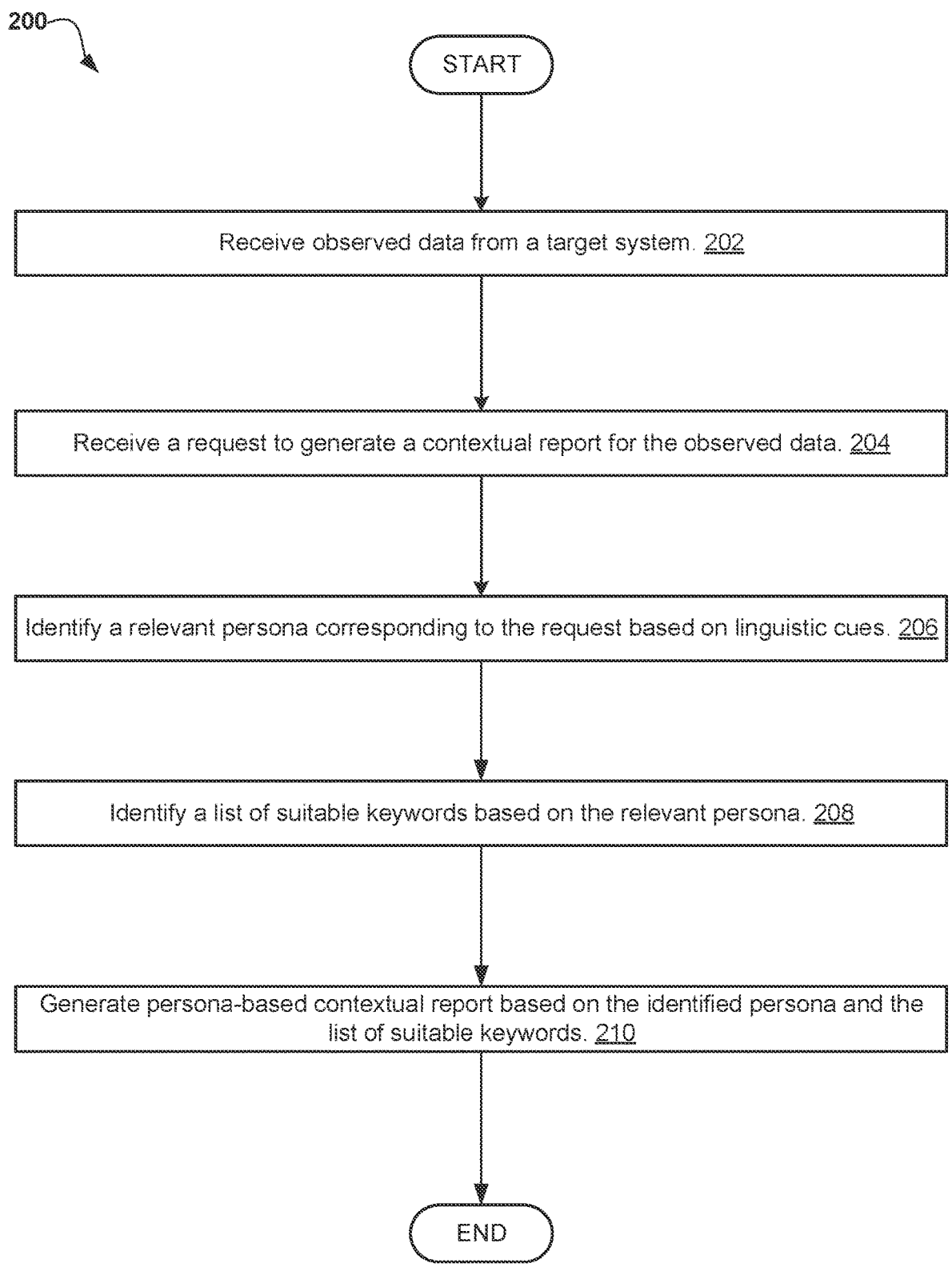
FIG. 2 illustrates an operational flowchart for an exemplary process of generating person-based contextual reports according to at least one embodiment.
Figure 3:
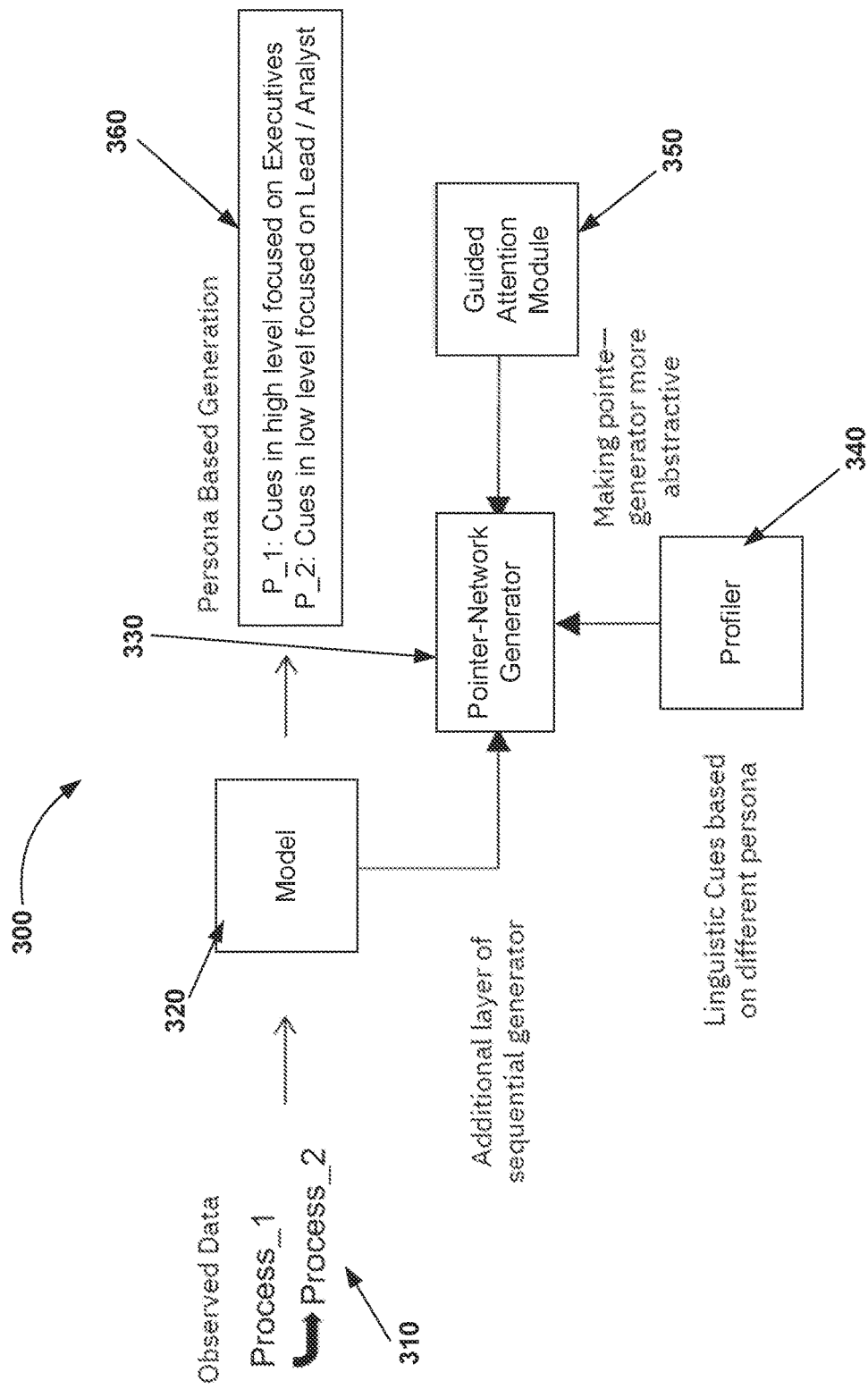
FIG. 3 depicts illustrative system architecture usable for performing an exemplary process of generating person-based contextual reports according to at least one embodiment.

Referring now to FIG. 2, an operational flowchart for an illustrative process 200 of generating person-based contextual reports according to at least one embodiment is provided. FIG. 3 will be discussed with reference to FIG. 2.

Specifically, FIG. 3 depicts illustrative system architecture 300 usable for performing an exemplary process of generating person-based contextual reports according to at least one embodiment. The exemplary system architecture 300 depicted in FIG. 3 includes a observed data 310, and a model 320 configured to perform an illustrative process of generating persona-based contextual reports in accordance with described embodiments. In some embodiments, the model 320 may further include and leverage any suitable known chatbots or large language models (not shown) for receiving user-made requests for contextual report generation. Model 320 may also include a pointer-network generator 330 configured to leverage, as inputs, observed data 310, data from a profiler 340 including a dictionary and list of keywords, and data from a guided attention module 350 including logical combinations regarding what types of language is associated with various personas or roles. In embodiments, model 302 may be configured to leverage the pointer-network generator 330 to generate persona-based contextual reports 360 as an output. In embodiments, each of the above-described components may be configured to communicate with a suitable storage mechanism, such as a database (not shown) which may include stored or historical data associated with a given monitored system, as well as be used to store data generated by an exemplary contextual report generation program 150. The details of how system architecture 300 is leveraged during the performance of illustrative processes of generating persona-based contextual reports in accordance with described embodiments will be explained in greater detail below in connection with the description of illustrative process 200.

Returning to FIG. 2, at step 202 of illustrative process 200, contextual report generation program 150 may receive observed data from a monitored system. The monitored system may be any suitable application, system, or technological environment which generates data that may be processed, stored, or otherwise leveraged to generate contextual reports. In the context of this disclosure, the observed data may include any actual data that is received, sent by, or processed by the monitored system. For example, at this step contextual generation program 150 may receive observed data in the form of a series of process trees or process flow data, represented by observed data 310 in FIG. 3, associated with an exemplary monitored system 'S1' which is being monitored for potential cybersecurity threats. In embodiments, the received observed data may be fed into and stored within a suitable storage mechanism, such as a database (not shown) associated with and accessible by an exemplary model 'M1' leverageable by contextual report generation program 150 to generate persona-based contextual reports. In other embodiments, it is envisioned that the observed data may include hypothetical data that is generated by the monitored system, rather than actual data that is practically received by the monitored system. In such embodiments, the generated hypothetical data may be stored within an accessible database of the monitored system, and may therefore be leveraged by the monitored system, auxiliary programs associated with the monitored system, as well as contextual report generation program 150.

Next, at 204, contextual report generation program 150 may receive a request to generate a contextual report based on the observed data. The received request to generate a contextual report may include automatic and continuous requests made by the monitored system for regularly output contextual reports. In other embodiments, the received requests may be manually input by a user, the requests being received via any suitable user input, including but not limited to requests made using text, voice, or any other known methods of inputting a request into a computer system employing contextual report generation program 150. In such embodiments, contextual report generation program 150 may be configured to leverage suitable known chatbots or large language models to support user-received requests for contextual report generation. In embodiments, contextual report generation program 150 may leverage any suitable known natural language processing techniques to interpret the semantics of a received request to determine that the received request is intended to request the generation of a contextual report based on the observed data received at step 202.

At step 206, contextual report generation program 150 may identify a relevant persona corresponding to the request based on a series of linguistic cues. In the context of this disclosure, a persona refers to a specific role or type of individual within an organization that is associated with a given job or set of responsibilities. Different personas may be associated with different sets of features, education levels, sets of responsibilities, or other useful characteristics that may be leveraged during the generation of persona-based contextual reports. In embodiments, contextual report generation program 150 may be configured to leverage a guided attention module, such as guided attention module 350 shown in FIG. 3, to determine if a received request includes language or data indicating that the request is likely associated with a given persona. In embodiments, the guided attention module leveraged by contextual report generation program 150 may be pretrained, with a dictionary of linguistic cues, by the organization employing contextual report generation program 150 and may further leverage any suitable known natural language processing techniques to process a series of linguistic cues contained within the received request. For example, if a suitable chatbot leveraged by contextual report generation program 150 received an exemplary request 'R1' for a contextual report which includes the language "Please generate a contextual report including root cause analysis for . . . " then contextual report generation program 150 may leverage guided attention module 350 to determine that exemplary request 'R1' is associated with an exemplary relevant persona 'P1' corresponding to cybersecurity professionals. In this example, the identified relevant persona of cybersecurity professionals would benefit from contextual report language that is more technical in nature and may further include code or more specific technical details related to the observed data associated with exemplary request 'R1'. In other embodiments, contextual report generation program 150 may be configured to leverage the guided attention module 350 to compare stored historical data from the monitored system with the received request to identify potentially relevant personas or roles. In other embodiments, guided attention module 350 of contextual report generation program 150 may simply analyze the received request to determine if explicit keywords associated with a given persona or role are contained within the received request. In yet another embodiment, contextual report generation program 150 may be configured to determine a relevant persona based on the received request by leveraging user profiles stored within the target system or employed chatbot. In such embodiments, the use profiles may correspond to specific permissions associated with a given persona or role that would be incorporated within any request that is input by a given user. In embodiments, the guided attention module 350 of contextual report generation program 150 may be configured to further determine logical combinations of potential keywords that are strongly associated with the identified relevant persona. In other words, guided attention module 350 will identify which language is likely associated with which relevant personas. This information will be further leveraged by contextual report generation program 150 in subsequent steps as described in greater detail below.

Next, at 208, contextual report generation program 150 may identify a list of suitable keywords based on the identified relevant persona. At this step, having identified the relevant persona for the contextual report request (and the logical combinations determined by guided attention module 350), contextual report generation program 150 may consult an accessible exemplary profiler (See profiler 340 in FIG. 3) to identify a list of suitable keywords (derived from the comprehensive list of keywords in the dictionary of the profiler) that are most appropriate for effectively communicating information to an individual corresponding to the relevant persona. In embodiments, the profiler 340 of contextual report generation program 150 may include a preconfigured dictionary with keywords contained therein that are associated with various given personas or roles. In other embodiments, the profiler 340 may be configured to leverage stored data from the monitored system related to activities associated with a specific persona or role (system interactions, data access, application usage, network behaviors, etc.) to identify or update specific keywords or terms that are frequently associated with a given persona or role to the dictionary (list of keywords). In embodiments, any updated keywords or terms may be stored within a suitable storage system, such as a database.

Thereafter, at 210, contextual report generation program 150 may generate a persona-based contextual report for the observed data based on the identified relevant persona and the list of suitable keywords. By leveraging the identified persona and the identified list of keywords from steps 206 and 208 respectively, contextual report generation program 150 may generate a persona-based contextual report which is more tailored to the communication style and needs associated with the received request. In embodiments, contextual report generation program 150 may generate the contextual report by leveraging an exemplary model 320 including a pointer-network generator 330 as shown in FIG. 3. The pointer-network generator 330 allows for leveraging of known natural processing techniques to tailor the language, tone, and level of technical detail of the generated contextual report with the identified persona associated with the received request. In embodiments, the generated persona-based contextual report may be output to an end user using any known methods, such as for example, a suitable user interface (UI), an email message, a text message, an audio message, or any other suitable methods for communicating the contents of the generated persona-based contextual report.

It may be appreciated that contextual report generation program 150 has thus provided for generation of improved person-based contextual reports. Described embodiments leverage linguistic cues to identify a relevant persona that corresponds to an appropriate context for the contextual report to be generated. Described embodiments further identify and leverage suitable keywords that are appropriate for the identified persona to ensure that the individual utilizing the contextual report will be able to easily comprehend the generated contextual report. This combination of steps allows for text generation using a guided approach for different personas without deviating form the nature of the linguistic characteristics used and relied upon by different types of individuals who may have different roles within an organization.

Presently described embodiments may relate to the following clauses:

Clause 1: A computer-based method of generating persona-based context reports, the method including: receiving observed data from a monitored system, receiving a request to generate a contextual report based on the observed data, identifying a relevant persona corresponding to the request based on a series of linguistic cues, identifying a list of suitable keywords based on the identified relevant persona, and generating a persona-based contextual report for the observed data based on the identified relevant persona and the list of suitable keywords. Described embodiments may thus leverage linguistic cues to identify a relevant persona that corresponds to an appropriate context for a contextual report to be generated and identify and leverage suitable keywords that are appropriate for the identified persona to ensure that the individual utilizing the contextual report will be able to easily comprehend the generated contextual report. This combination of steps allows for text generation using a guided approach for different personas without deviating form the nature of the linguistic characteristics used and relied upon by different types of individuals who may have different roles within an organization.

Clause 2: The computer-based method of clause 1, where the received request to generate the contextual report based on the observed data may be automatically generated by the monitored system. In embodiments, this provides for continuously generated contextual reports which may be associated with specific personas, the generated contextual reports being easily accessible at any time.

Clause 3: The computer-based method of any of the preceding clauses 1-2, where the received request to generate the contextual report based on the observed data may be manually input by a user. In embodiments, the received request may be received via manual input by a user to minimize the amount of work and resources that would be needed to automatically generate contextual reports regularly. Additionally, such embodiments provide users with flexibility and customization when making a specific request for a contextual report related to a given topic or matter.

Clause 4: The computer-based method of any of the preceding clauses 1-3, where the series of linguistic cues may be contained within the received request. In such embodiments, the linguistic cues leveraged to determine a relevant persona may be contained within the received request, for example, within the natural language making up a received request received by a chatbot employed with described embodiments.

Clause 5: The computer-based method of any of the preceding clauses 1-4, where the described methods further including: updating the list of suitable keywords by leveraging stored data from the monitored system. In such embodiments, the leveraged stored data from the monitored system related to activities associated with a specific persona or role (system interactions, data access, application usage, network behaviors, etc.) may be used to identify or update specific keywords or terms that are frequently associated with a given persona or role to the dictionary (list of keywords). This may help to improve the accuracy and efficiency of future contextual report generation.

Clause 6: The computer-based method of any of the preceding clauses 1-5, where identifying the relevant persona corresponding to the request based on the series of linguistic cues may further include comparing the series of linguistic cues with historical data to identify associations with a potentially relevant persona. In such embodiments, the determination of the relevant persona is made more efficient and accurate by adding a layer of consideration related to historical data, rather than merely leveraging the language of the received request or a user profile associated with the user. Such embodiments may leverage additional data garnered from past interactions associated with the monitored system to strengthen the confidence of any determinations made.

Clause 7: The computer-based method of any of the preceding clauses 1-6, where the received observed data may include hypothetical data generated and stored by the monitored system. In such embodiments, if the monitored system is configured to automatically generate hypothetical data that is leveraged for various purposes and subsequently stored, described embodiments may be configured to leverage the stored hypothetical data generated by the monitored system. This may improve performance and confidence by increasing the amount of available data considered when generating contextual reports.

Clause 8: A computer system, the computer system including one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method including receiving observed data from a monitored system, receiving a request to generate a contextual report based on the observed data, identifying a relevant persona corresponding to the request based on a series of linguistic cues, identifying a list of suitable keywords based on the identified relevant persona, and generating a persona-based contextual report for the observed data based on the identified relevant persona and the list of suitable keywords. Such embodiments provide for a computer system configured to leverage linguistic cues to identify a relevant persona that corresponds to an appropriate context for a contextual report to be generated and identify and leverage suitable keywords that are appropriate for the identified persona to ensure that the individual utilizing the contextual report will be able to easily comprehend the generated contextual report. This combination of steps allows for text generation using a guided approach for different personas without deviating form the nature of the linguistic characteristics used and relied upon by different types of individuals who may have different roles within an organization.

Clause 9: The computer system of clause 8, where the received request to generate the contextual report based on the observed data may be automatically generated by the monitored system. In embodiments, this provides for continuously generated contextual reports which may be associated with specific personas, the generated contextual reports being easily accessible at any time.

Clause 10: The computer system of any of the preceding clauses 8-9, where the received request to generate the contextual report based on the observed data may be manually input by a user. In embodiments, the received request may be received via manual input by a user to minimize the amount of work and resources that would be needed to automatically generate contextual reports regularly. Additionally, such embodiments provide users with flexibility and customization when making a specific request for a contextual report related to a given topic or matter.

Clause 11: The computer system of any of the preceding clauses 8-10, where the series of linguistic cues may be contained within the received request. In such embodiments, the linguistic cues leveraged to determine a relevant persona may be contained within the received request, for example, within the natural language making up a received request received by a chatbot employed with described embodiments.

Clause 12: The computer system of any of the preceding clauses 8-11, where the described methods further including: updating the list of suitable keywords by leveraging stored data from the monitored system. In such embodiments, the leveraged stored data from the monitored system related to activities associated with a specific persona or role (system interactions, data access, application usage, network behaviors, etc.) may be used to identify or update specific keywords or terms that are frequently associated with a given persona or role to the dictionary (list of keywords). This may help to improve the accuracy and efficiency of future contextual report generation.

Clause 13: The computer system of any of the preceding clauses 8-12, where identifying the relevant persona corresponding to the request based on the series of linguistic cues may further include comparing the series of linguistic cues with historical data to identify associations with a potentially relevant persona. In such embodiments, the determination of the relevant persona is made more efficient and accurate by adding a layer of consideration related to historical data, rather than merely leveraging the language of the received request or a user profile associated with the user. Such embodiments may leverage additional data garnered from past interactions associated with the monitored system to strengthen the confidence of any determinations made.

Clause 14: The computer system of any of the preceding clauses 8-13, where the received observed data may include hypothetical data generated and stored by the monitored system. In such embodiments, if the monitored system is configured to automatically generate hypothetical data that is leveraged for various purposes and subsequently stored, described embodiments may be configured to leverage the stored hypothetical data generated by the monitored system. This may improve performance and confidence by increasing the amount of available data considered when generating contextual reports.

Clause 15: A computer program product, the computer program product including one or more computer-readable tangible storage medium and program instructions stored on at least one of the one or more computer-readable tangible storage medium, the program instructions executable by a processor capable of performing a method, the method including: receiving observed data from a monitored system, receiving a request to generate a contextual report based on the observed data, identifying a relevant persona corresponding to the request based on a series of linguistic cues, identifying a list of suitable keywords based on the identified relevant persona, and generating a persona-based contextual report for the observed data based on the identified relevant persona and the list of suitable keywords. Such embodiments provide for a computer program product configured to leverage linguistic cues to identify a relevant persona that corresponds to an appropriate context for a contextual report to be generated and identify and leverage suitable keywords that are appropriate for the identified persona to ensure that the individual utilizing the contextual report will be able to easily comprehend the generated contextual report. This combination of steps allows for text generation using a guided approach for different personas without deviating form the nature of the linguistic characteristics used and relied upon by different types of individuals who may have different roles within an organization.

Clause 16: The computer program product of clause 15, where the received request to generate the contextual report based on the observed data may be automatically generated by the monitored system. In embodiments, this provides for continuously generated contextual reports which may be associated with specific personas, the generated contextual reports being easily accessible at any time.

Clause 17: The computer program product of any of the preceding clauses 15-16, where the received request to generate the contextual report based on the observed data may be manually input by a user. In embodiments, the received request may be received via manual input by a user to minimize the amount of work and resources that would be needed to automatically generate contextual reports regularly. Additionally, such embodiments provide users with flexibility and customization when making a specific request for a contextual report related to a given topic or matter.

Clause 18: The computer program product of any of the preceding clauses 15-17, where the series of linguistic cues may be contained within the received request. In such embodiments, the linguistic cues leveraged to determine a relevant persona may be contained within the received request, for example, within the natural language making up a received request received by a chatbot employed with described embodiments.

Clause 19: The computer program product of any of the preceding clauses 15-18, where the described methods further including: updating the list of suitable keywords by leveraging stored data from the monitored system. In such embodiments, the leveraged stored data from the monitored system related to activities associated with a specific persona or role (system interactions, data access, application usage, network behaviors, etc.) may be used to identify or update specific keywords or terms that are frequently associated with a given persona or role to the dictionary (list of keywords). This may help to improve the accuracy and efficiency of future contextual report generation.

Clause 20: The computer program product of any of the preceding clauses 15-19, where identifying the relevant persona corresponding to the request based on the series of linguistic cues may further include comparing the series of linguistic cues with historical data to identify associations with a potentially relevant persona. In such embodiments, the determination of the relevant persona is made more efficient and accurate by adding a layer of consideration related to historical data, rather than merely leveraging the language of the received request or a user profile associated with the user. Such embodiments may leverage additional data garnered from past interactions associated with the monitored system to strengthen the confidence of any determinations made.

It may be appreciated that FIGS. 2-3 provide only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of generating persona-based context reports, the method comprising:
   accessing observed data from a monitored system stored in a database;
   receiving a request to generate a contextual report based on the observed data, wherein the request indicates a user profile;
   determining, from the user profile, a relevant persona corresponding to the request, wherein the user profile corresponds to specific permissions associated with the relevant persona;
   identifying a list of suitable keywords for communicating the contextual report to the relevant persona, wherein the list of suitable keywords are determined based on analyzing system interactions and data access by the relevant persona; and
   generating a persona-based contextual report for the observed data based on the list of suitable keywords, tone, and level of technical detail tailored to the relevant persona.

2. The computer-based method of claim 1, wherein the request to generate the contextual report based on the observed data is automatically generated by the monitored system.

3. The computer-based method of claim 1, wherein the request to generate the contextual report based on the observed data is manually input by a user.

4. The computer-based method of claim 1, wherein the series of linguistic cues are contained within request.

5. The computer-based method of claim 1, further comprising:
   updating the list of suitable keywords by leveraging stored data from the monitored system.

6. The computer-based method of claim 1, wherein identifying the relevant persona corresponding to the request based on the series of linguistic cues further comprises:
   comparing the series of linguistic cues with historical data to identify associations with a potentially relevant persona.

7. The computer-based method of claim 1, wherein the observed data includes hypothetical data generated and stored by the monitored system.

8. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   accessing observed data from a monitored system stored in a database;
   receiving a request to generate a contextual report based on the observed data, wherein the request indicates a user profile;
   determining, from the user profile, a relevant persona corresponding to the request, wherein the user profile corresponds to specific permissions associated with the relevant persona;
   identifying a list of suitable keywords for communicating the contextual report to the relevant persona, wherein the list of suitable keywords are determined based on analyzing system interactions and data access by the relevant persona; and
   generating a persona-based contextual report for the observed data based on the list of suitable keywords, tone, and level of technical detail tailored to the relevant persona.

9. The computer system of claim 8, wherein the request to generate the contextual report based on the observed data is automatically generated by the monitored system.

10. The computer system of claim 8, wherein the request to generate the contextual report based on the observed data is manually input by a user.

11. The computer system of claim 8, wherein the series of linguistic cues are contained within the request.

12. The computer system of claim 8, further comprising:
    updating the list of suitable keywords by leveraging stored data from the monitored system.

13. The computer system of claim 8, wherein identifying the relevant persona corresponding to the request based on the series of linguistic cues further comprises:
    comparing the series of linguistic cues with historical data to identify associations with a potentially relevant persona.

14. The computer system of claim 8, wherein the observed data includes hypothetical data generated and stored by the monitored system.

15. A computer program product, the computer program product comprising:
- one or more computer-readable tangible storage medium and program instructions stored on at least one of the one or more computer-readable tangible storage medium, the program instructions executable by a processor capable of performing a method, the method comprising:
  - accessing observed data from a monitored system stored in a database;
  - receiving a request to generate a contextual report based on the observed data, wherein the request indicates a user profile;
  - determining, from the user profile, a relevant persona corresponding to the request, wherein the user profile corresponds to specific permissions associated with the relevant persona;
  - identifying a list of suitable keywords for communicating the contextual report to the relevant persona, wherein the list of suitable keywords are determined based on analyzing system interactions and data access by the relevant persona; and
  - generating a persona-based contextual report for the observed data based on the list of suitable keywords, tone, and level of technical detail tailored to the relevant persona.

16. The computer program product of claim 15, wherein the request to generate the contextual report based on the observed data is automatically generated by the monitored system.

17. The computer program product of claim 15, wherein the request to generate the contextual report based on the observed data is manually input by a user.

18. The computer program product of claim 15, wherein the series of linguistic cues are contained within the request.

19. The computer program product of claim 15, further comprising:
- updating the list of suitable keywords by leveraging stored data from the monitored system.

20. The computer program product of claim 19, wherein identifying the relevant persona corresponding to the request based on the series of linguistic cues further comprises:
- comparing the series of linguistic cues with historical data to identify associations with a potentially relevant persona.

* * * * *